United States Patent
Hennessey et al.

(10) Patent No.: US 7,450,524 B2
(45) Date of Patent: Nov. 11, 2008

(54) METHOD AND APPARATUS FOR DETERMINING NETWORK TOPOLOGY IN A PEER-TO-PEER NETWORK

(75) Inventors: Wade L Hennessey, Palo Alto, CA (US); John B. Wainwright, Los Gatos, CA (US)

(73) Assignee: Kontiki, Inc., Sunnyvale, CA (US)

( * ) Notice: Subject to any disclaimer, the term of this patent is extended or adjusted under 35 U.S.C. 154(b) by 1079 days.

(21) Appl. No.: 10/611,772

(22) Filed: Jun. 30, 2003

(65) Prior Publication Data
US 2004/0264385 A1    Dec. 30, 2004

(51) Int. Cl.
*H04L 12/28* (2006.01)
(52) U.S. Cl. ...................................... 370/254
(58) Field of Classification Search ......... 370/254–258; 709/200–203, 223, 238, 243, 244, 249
See application file for complete search history.

(56) References Cited

U.S. PATENT DOCUMENTS

| | | | |
|---|---|---|---|
| 5,191,650 A * | 3/1993 | Kramer et al. ............... | 709/227 |
| 5,321,815 A * | 6/1994 | Bartolanzo et al. .......... | 709/241 |
| 5,884,031 A | 3/1999 | Ice | |
| 6,014,667 A | 1/2000 | Jenkins et al. | |
| 6,185,598 B1 * | 2/2001 | Farber et al. ................ | 709/200 |
| 6,678,264 B1 * | 1/2004 | Gibson ....................... | 370/352 |
| 6,816,862 B2 * | 11/2004 | Mulgund et al. ............. | 707/10 |
| 6,832,253 B1 | 12/2004 | Auerbach | |
| 6,975,619 B1 * | 12/2005 | Byers et al. ................. | 370/351 |
| 7,020,719 B1 | 3/2006 | Grove et al. | |
| 7,065,584 B1 * | 6/2006 | Shavitt et al. ............... | 709/241 |
| 7,072,982 B2 * | 7/2006 | Teodosiu et al. ............ | 709/245 |
| 7,193,968 B1 * | 3/2007 | Kapoor et al. .............. | 370/235 |
| 7,200,658 B2 * | 4/2007 | Goeller et al. .............. | 709/224 |
| 2002/0026511 A1 | 2/2002 | Garcia-Luna-Aceves et al. | |
| 2002/0062336 A1 * | 5/2002 | Teodosiu et al. ............ | 709/201 |
| 2002/0062375 A1 * | 5/2002 | Teodosiu et al. ............ | 709/226 |

(Continued)

FOREIGN PATENT DOCUMENTS

EP    0 618 708 A2    2/1994

(Continued)

OTHER PUBLICATIONS

Amini, Lisa, et al, "Modeling Redirection in Geographically Diverse Server Sets," Proceedings of the 12th International Conference on World Wide Web WWW '03, May 20, 2003, ACM Press, pp. 472-481.

(Continued)

*Primary Examiner*—Dmitry Levitan
(74) *Attorney, Agent, or Firm*—Park, Vaughan & Fleming LLP

(57) ABSTRACT

One embodiment of the present invention provides a system that facilitates determining the network topology in a peer-to-peer network. The system operates by performing a tracerouting operation to obtain a traceroute from a first client to a directory server, wherein a traceroute describes a path through which a packet travels between the first client and the directory server, including addresses of the routers through which the packet travels. Next, the system sends the traceroute to the directory server from the first client. The directory server then uses the traceroute to build a router graph that represents the topology of the peer-to-peer network.

18 Claims, 6 Drawing Sheets

U.S. PATENT DOCUMENTS

| | | | |
|---|---|---|---|
| 2002/0107982 A1* | 8/2002 | Teodosiu et al. | 709/245 |
| 2002/0143918 A1* | 10/2002 | Soles et al. | 709/223 |
| 2002/0143991 A1* | 10/2002 | Chow et al. | 709/245 |
| 2002/0152318 A1 | 10/2002 | Menon et al. | |
| 2003/0097438 A1* | 5/2003 | Bearden et al. | 709/224 |
| 2003/0099202 A1 | 5/2003 | Lear et al. | |
| 2004/0267875 A1 | 12/2004 | Hennessey et al. | |
| 2005/0004916 A1* | 1/2005 | Miller et al. | 707/10 |
| 2006/0149806 A1 | 7/2006 | Scott et al. | |

FOREIGN PATENT DOCUMENTS

| | | |
|---|---|---|
| WO | WO 01/93064 | 12/2001 |
| WO | WO 02/05843 | 8/2002 |

OTHER PUBLICATIONS

Wang, Limin, et al, "The Effectiveness of Request for Redistribution on CDN Robustness," 5th Symposium on Operating Systems Design and Implementation, ACM SIGOPS Operating Systems Review, Dec. 2002, ACM Press, pp. 345-360.

Krishnamurthy, Balachander, et al, "On the Use and Performance of Content Distribution Networks," Proceedings of the 1st ACM SIGCOMM Workshop on Internet Measurement IMW'01, Nov. 2001, ACM Press, pp. 169-182.

Kangasharju, Jussi, et al, "Locating Copies of Objects Using the Domain Name System," Proceedings of the International Caching Workshop, XP002197618, XX, XX, 1999, pp. 1-12.

Vellanki, V, et al, "Domain Caching: Building Web Services for Live Events," The Second IEEE Workshop on Internet Applications, WIAPP 2001, vol. ISBN 0-7695-1137-6, XP-002219309, pp. 133-142.

U.S. Appl. No. 60/252658.

U.S. Appl. No. 60/252659.

* cited by examiner

| INCOMING REQUEST 400 | | | |
|---|---|---|---|
| INTERNAL IP 402 | EXTERNAL IP 404 | MOID 408 | ... |

| INVENTORY 212 | | |
|---|---|---|
| MOID 408 | NODE 502 | RANGE SET 504 |
| | | |
| | | |
| | | |

METHOD AND APPARATUS FOR DETERMINING NETWORK TOPOLOGY IN A PEER-TO-PEER NETWORK

RELATED APPLICATION

The subject matter of this application is related to the subject matter in a co-pending non-provisional application by the same inventors as the instant application and filed on the same day as the instant application entitled, "Method and Apparatus for Establishing Peering Rules for Distributed Content Delivery," having Ser. No. 10/611,783, and filing date Jun. 30, 2003.

BACKGROUND

1. Field of the Invention

The present invention relates to systems that communicate across computer networks. More specifically, the present invention relates to a method and apparatus for determining network topology in a distributed peer-to-peer network.

2. Related Art

The explosion of broadband communications has helped the Internet become a viable distribution mechanism for multimedia and high quality video. Prior to broadband, Internet connections were much too slow for the large file sizes required to transmit multimedia and high quality video. Now that more and more people have broadband connections and are requesting ever-larger items of content, bandwidth and server utilization is quickly becoming a bottleneck on the distribution end. For example, in some cases, extraordinary events have brought online news sites to a virtual standstill as people flocked to them to retrieve video of the events.

Some companies have tried to solve this problem by creating distributed content delivery networks. In a distributed content delivery network, once a peer has received a file, the peer becomes a potential server for that file to other clients. This is a great advantage because as peers download the content, the number of potential servers for the content grows. In this way, the classic bottleneck caused by many clients trying to retrieve the same content from a single server is virtually eliminated.

However, because peers on a distributed content delivery network are relatively ignorant of the network topology, they can make bad decisions about how to deliver content. For example, a peer may attempt to retrieve content from a server that is located a large number of hops away, when a closer server is able to serve the same content. This sub-optimal choice of servers can result in poor performance in retrieving content and can create unnecessary network traffic.

Hence, what is needed is a method and an apparatus that uses information about network topology in selecting servers to deliver content. Note that it can be problematic to determine the topology of a network, because the topology continually changes over time as nodes are added and removed from the network, and as network links are established or become unavailable.

In some cases, network administrators may have knowledge about network topology that is useful in selecting servers to supply content. For example, a network administrator may know that certain peers are closer to each other or are connected by higher bandwidth connections. In other cases, a network administrator may not want to use certain bandwidth-critical network links or nodes for content delivery purposes.

Hence, what is needed is a method and an apparatus that allows a network administrator to explicitly establish peering policies for a content delivery network.

SUMMARY

One embodiment of the present invention provides a system that facilitates determining the network topology in a peer-to-peer network. The system operates by performing a tracerouting operation to obtain a traceroute from a first client to a directory server, wherein a traceroute describes a path through which a packet travels between the first client and the directory server, including addresses of the routers through which the packet travels. Next, the system sends the traceroute to the directory server from the first client. The directory server then uses the traceroute to build a router graph that represents the topology of the peer-to-peer network.

In a variation on this embodiment, the system additionally performs a tracerouting operation between the first client and a second client, and sends the traceroute to the directory server to be used in building the router graph.

In a variation on this embodiment, the system determines the MAC address of the first client's gateway, and sends the MAC address to the directory server, wherein the directory server can use the MAC address to determine if any other clients are on the same subnet as the first client.

In a variation on this embodiment, building the router graph involves sorting a list of addresses for routers received at the directory server from the traceroutes. Next, the system uses the sorted list to determine which addresses are assigned to which routers, wherein each router has two or more network interfaces and each interface has an address. This will be described in more detail later in the specification.

In a variation on this embodiment, the system uses the router graph to optimize data transfers within the peer-to-peer network.

In a variation on this embodiment, the system classifies the first client as a member of a router group based on the first public address found in the traceroute, wherein the router group is a collection of clients that communicate through a common router.

In a variation on this embodiment, the system removes information from the router graph if the information has not been validated for a specified period of time.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Distributed Computing System

Figure 1:
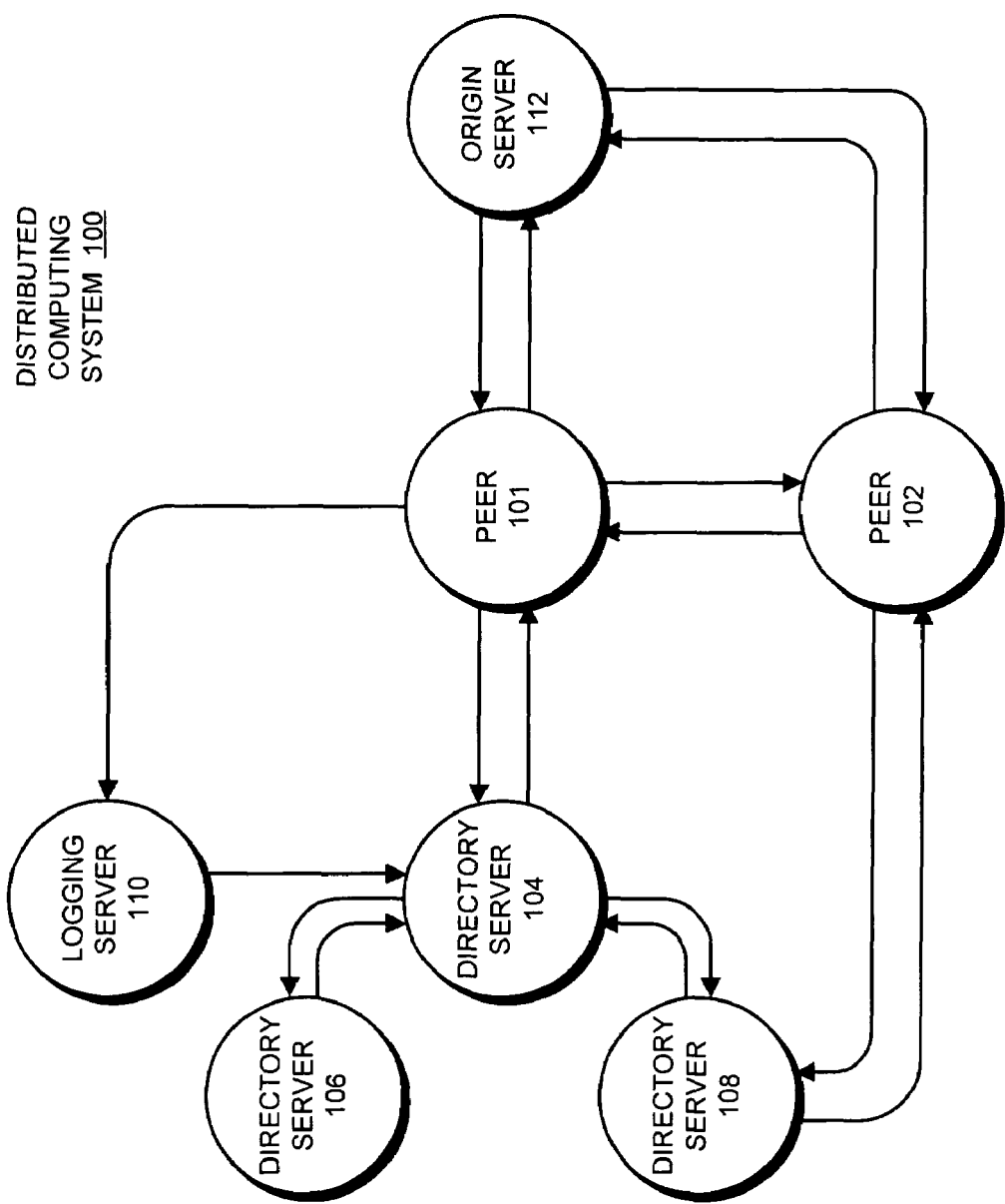
FIG. 1 illustrates a distributed computer system in accordance with an embodiment of the present invention.

FIG. 1 illustrates a distributed computing system 100 in accordance with an embodiment of the present invention. Distributed computing system 100 contains peer 101 and peer 102. Peers 101 and 102 can generally include any node on a network including computational capability and including a mechanism for communicating across the network. Note that peers 101 and 102 can act as clients and as candidate servers that can potentially serve content to other clients. Distributed computing system 100 can include small local area networks, as well as large wide area networks. In one embodiment of the present invention, distributed computing system 100 includes the Internet. FIG. 1 also contains directory servers 104, 106 and 108, logging server 110, and origin server 112. Servers 104, 106, 108, 110 and 112 can generally include any nodes on a computer network including a mechanism for servicing requests from a client for computational and/or data storage resources.

In one embodiment of the present invention, peer 101 sends a request for content to directory server 104. Directory server 104 may additionally forward or redirect the request on to directory server 106 or directory server 108. Directory server 104 then sends a list of potential candidates back to peer 101. Note that any time a peer makes a request for content, then that peer becomes a potential candidate server for the content and may appear in the list of potential candidate servers that is forwarded to other clients. This list of candidates can optionally identify origin server 112 which contains the original source for the content. Peer 101 then uses this list to request content from peer 102. Peer 101 also sends feedback information back to logging server 110, such as the parts of the content that it has and the servers that it has tried to download from. Logging server 110 subsequently forwards the feedback information from peer 101 to directory server 104. Directory server 104 uses this information in response to future requests for the content.

Directory Server Architecture

Figure 2:
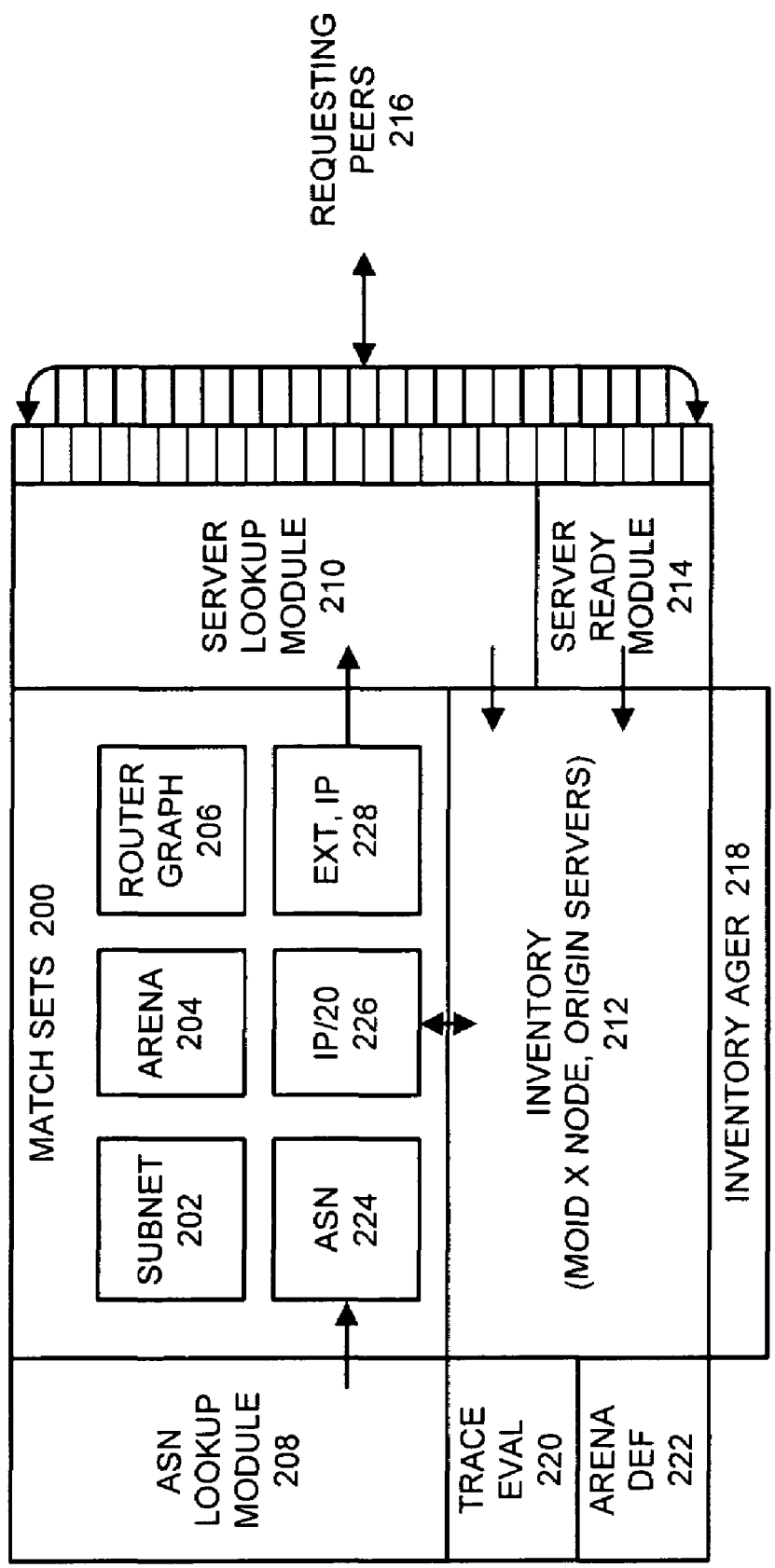
FIG. 2 illustrates the directory server architecture in accordance with an embodiment of the present invention.

FIG. 2 illustrates the architecture of directory server 104 in accordance with an embodiment of the present invention. Directory server 104 contains inventory 212. Inventory 212 includes a list of the potential candidates for items of content that have been published. When one of the requesting peers 216 submits a request to directory server 104 for content, ASN lookup module 208 determines the autonomous system number (ASN) of the autonomous system (AS) of which the peer is a member.

Directory server 104 maintains a set of prioritized lists of inventory 212 based on the items in match sets 200. These items include subnet 202, arena 204, and router graph 206. Subnet 202 is a collection of nodes that are on the same local subnet. Each node in the subnet 202 has returned an identical MAC address for its gateway router, thus indicating membership in the same subnet.

Arena 204 is a collection of nodes that can be specified by a system administrator. In one embodiment, an arena in arena 204 is defined by a set of edge routers. An edge router is a router that typically separates a network from another network as opposed to gateway routers that typically connect a collection of nodes to a network. For example, an edge router might connect a company's Houston-based operation to the same company's Los Angeles-based operation. In a variation on this embodiment, the system uses tracerouting information to classify nodes into arenas. The system can determine if a node is behind a specific edge router or set of edge routers by analyzing the traceroute from the node to the server. If the address of the edge router appears in the traceroute, the system can subsequently classify the node as a member of the arena that is defined by that particular edge router.

In another embodiment of the present invention, arenas are defined by a list of IP addresses specified by a system administrator. In general, arenas can be defined by any method that can be used to define a group of nodes.

Router graph 206 specifies how the nodes and routers within the distributed computing system 100 are coupled together. Router graph 206 is constructed at directory server 104 using trace evaluation module 220. Trace evaluation module 220 receives information specifying traceroutes from peers to directory server 104, as well as traceroutes between peers.

Match sets 200 can additionally contain ASN 224, IP/20 network 226, and external IP address 228. Note that an IP/20 network is a collection of nodes that share a common IP address prefix consisting of 20 bytes. Moreover, an external IP address can include an IP address that has been assigned by a Network Address Translation (NAT) or similar device and can be different from the host's internal IP address. Server lookup module 210 determines the external IP address of the peer and places the information in inventory 212. If a candidate server has an identical external IP address to that of the peer, then it is likely to be topologically close to the peer. Likewise, if it is a member of the same IP/20 network as the peer, then it is also likely relatively to be topologically close to the peer.

When the system exhausts the available peers from one of the match sets in match sets 200, the system automatically falls back to the next set. For example, when there are no more peers with a copy of the content available from subnet 202, the system then falls back to arena 204. The order of precedence for fallback can be assigned by a system administrator. For example, the system can limit possible peers to arena 204 only. In this case, when the system exhausts the peers in arena 204, the system automatically directs peer 101 to origin server 112 rather than falling back to a different match set.

Fallback provisions can be incorporated into each match set in match sets 200 as well. For example, within arena 204, there may be numerous arenas defined along with a fallback list that specifies an order of precedence for arenas. When one arena is exhausted, peer 101 is directed to try the next arena in the order of precedence.

Trace evaluation module 220 analyzes the various traceroutes to determine how the peers and routers are interconnected. In one embodiment of the present invention, trace evaluation module 220 sorts the addresses of all of the routers and analyzes the list of addresses. In many cases, two consecutive addresses define opposite ends of a link in a router-to-router link. Note that the system operates in an untrusted environment, wherein routers and peers may not report accurate information. In some instances, routers intentionally report addresses that are wrong. To deal with this problem, a system of weights can be used to reinforce the router graph. Addresses and links that are reported multiple times, or are found to be correct may be assigned a higher weight, while links and addresses that are rarely reported, or are found to be incorrect, may be assigned a much lower weight or discarded. Additionally, trace evaluation module 220 "ages out" old information by removing information from router graph 206 if the information has not been received in a traceroute for a certain period of time.

System administrators can use arena definition module 222 to define an "arena" as is described below.

Server ready module 214 receives feedback information reported by requesting peers 216 (server ready reports) and updates inventory 212. Note that this feedback information can be received directly from requesting peers 216 or indirectly by way of a server designed to collect the feedback information and deliver it to server ready module 214. Inventory ager 218 removes candidates from inventory 212 if directory server 104 has not heard from the candidate servers within a certain period of time.

Network with Firewalls

Figures 3, 4, 5:
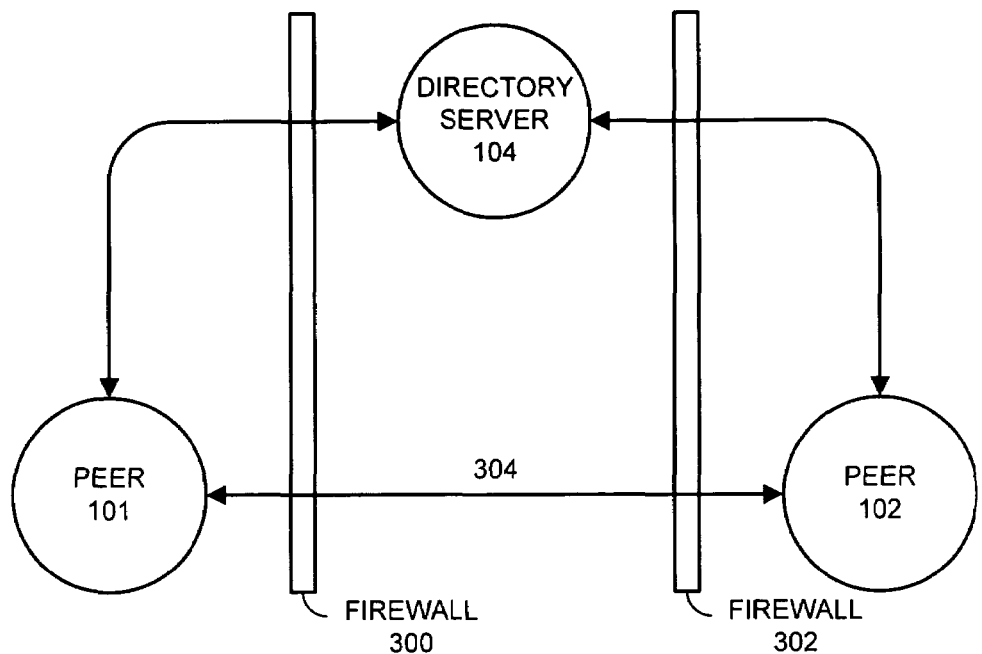
FIG. 3 illustrates a network with firewalls in accordance with an embodiment of the present invention.
FIG. 4 illustrates the attributes of a content request in accordance with an embodiment of the present invention.
FIG. 5 illustrates the directory server inventory in accordance with an embodiment of the present invention.

FIG. 3 illustrates a network with firewalls in accordance with an embodiment of the present invention. In FIG. 3, peer 101 is located behind firewall 300 and peer 102 is located behind firewall 302. Moreover, both peer 101 and peer 102 communicate with directory server 104 through their respective firewalls. During this communication, peer 101 requests content from directory server 104. Next, directory server 104 sends a list of candidate servers, including peer 102, to peer 101. Peer 101 then sends a request to peer 102 for the content via User Datagram Protocol (UDP). Peer 101 also sends a request for the content from peer 102 to directory server 104, which causes directory server 104 to direct peer 102 to send a packet to peer 101 via UDP. In one embodiment of the present invention, a separate relay server is used in place of directory server 104 to receive the request from peer 101 and to direct peer 102 to send the packet. (Note that in general other connectionless protocols can be used instead of UDP.) Since the request from peer 101 to peer 102 and the packet from peer 102 to peer 101 were sent via a connectionless protocol, they open ports in firewalls 300 and 302 that allows a connection 304 to be established between peer 101 and peer 102. Note that this works for NAT boxes as well as for firewalls. Also note that the firewall must be configured to allow outbound UDP traffic.

Attributes of a Content Request

FIG. 4 illustrates the attributes of a content request in accordance with an embodiment of the present invention. Incoming request 400 includes the following attributes: internal IP address 402; external IP address 404, and MOID 408. Note that MOID 408 is a unique identifier of the content that is assigned when the content is published. Internal IP address 402 is the IP address assigned at the node, and external IP address 404 is the IP address of a Network Address Translation (NAT) or similar device. Note that with the popularity of NAT devices, it is very common for peers in a NAT enabled LAN to have different internal IP addresses and an identical external IP address. This also works for networks without NAT devices. In this case, there is only an external IP address. Also note that a peer that is located behind a NAT device is unaware of its external IP address. External IP address 404 is determined at the server by analyzing the IP header associated with incoming request 400. It is also possible to analyze the content request to determine the ASN for the requestor's AS. ASN is the identifier of the Autonomous System (AS) for which a node belongs.

Directory Server Inventory

FIG. 5 illustrates the directory server inventory 212 from FIG. 2 in accordance with an embodiment of the present invention. Inventory 212 includes a list of all of the content and possible candidate servers of the content that are known by directory server 104. Inventory 212 also contains media object identifier MOID (media object identifier) 408 which identifies the content, node 502 which identifies a candidate server for the content, and range set 504 which identifies the pieces of the content that the candidate server has been reported as having in the past. Inventory 212 can be a subset of the entire universe of available content. Note that this facilitates scalability as different subsets of the entire universe of available content can reside on multiple directory servers. In another embodiment, range set 504 may not be included in inventory 212.

In one embodiment of the present invention, node 502 is identified using standard public key infrastructure (PKI) techniques.

Initial Content Request

Figure 6:
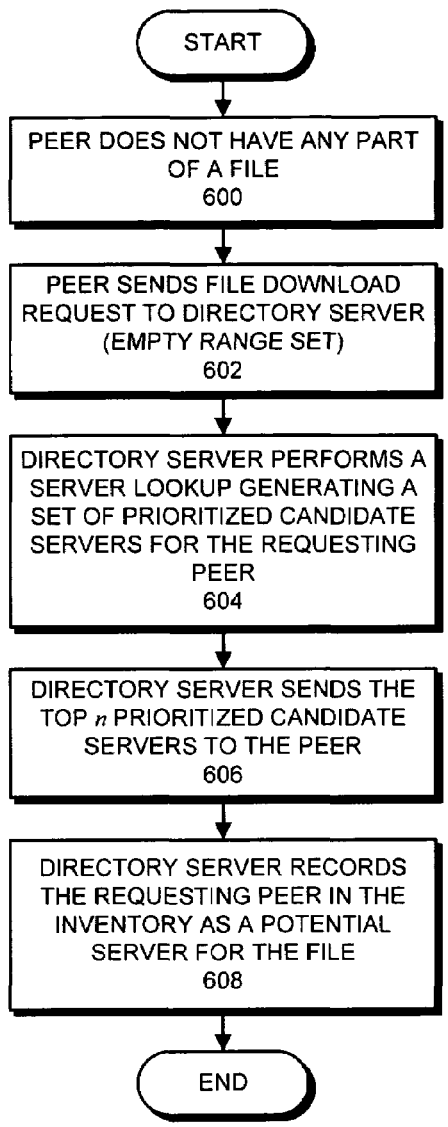
FIG. 6 presents a flowchart illustrating processing of an initial content request in accordance with an embodiment of the present invention.

FIG. 6 illustrates processing of an initial content request in accordance with an embodiment of the present invention. The system starts when content is requested and peer 101 does not have any part of the content (step 600).

First, peer 101 sends a file download request to directory server 104 with an empty range set (step 602). Next, directory server 104 performs a server lookup from inventory 212 and generates a prioritized list of candidate servers for the content (step 604). Then, directory server 104 returns the top n candidate servers from the prioritized list to peer 101 (step 606). Finally, directory server 104 records peer 101 in inventory 212 as a possible future candidate server for the content (step 608).

Subsequent Content Request

Figure 7:
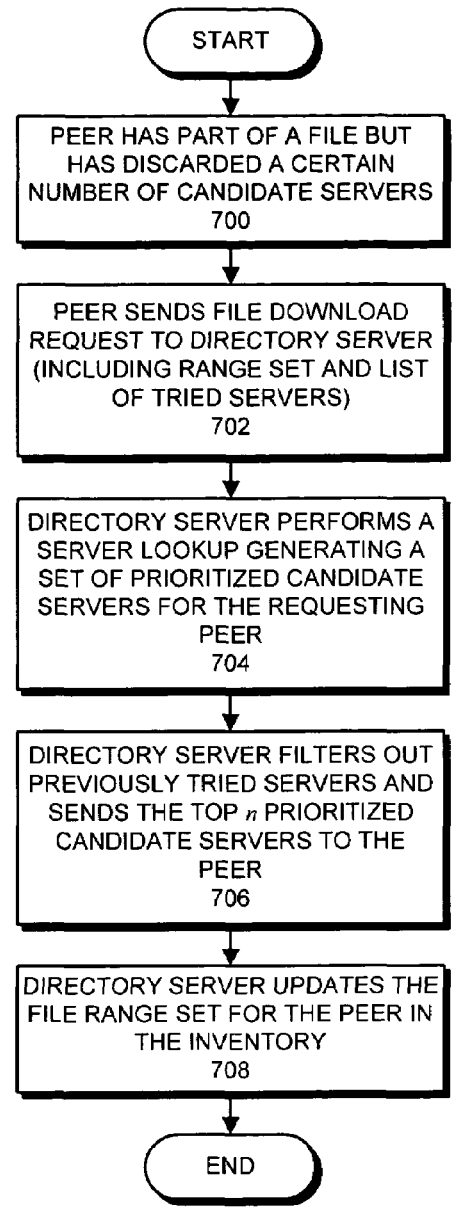
FIG. 7 presents a flowchart illustrating processing of a subsequent content request in accordance with an embodiment of the present invention.

FIG. 7 illustrates processing of a subsequent content request in accordance with an embodiment of the present invention. The system starts when peer 101 has received part of a file, but has discarded a certain number of candidate servers for the file (step 700).

First, peer 101 sends a file download request to directory server 104 including an updated range set and a list of tried servers (step 702). Next, directory server 104 performs a server lookup from inventory 212 and generates a prioritized list of candidate servers for peer 101 (step 704). Then, directory server 104 filters out the previously tried servers and returns the top n candidate servers from the prioritized list to peer 101 (step 706). Finally, directory server 104 updates the file range set of the content in inventory 212 for peer 101 (step 708).

Inventory Aging

Figure 8:
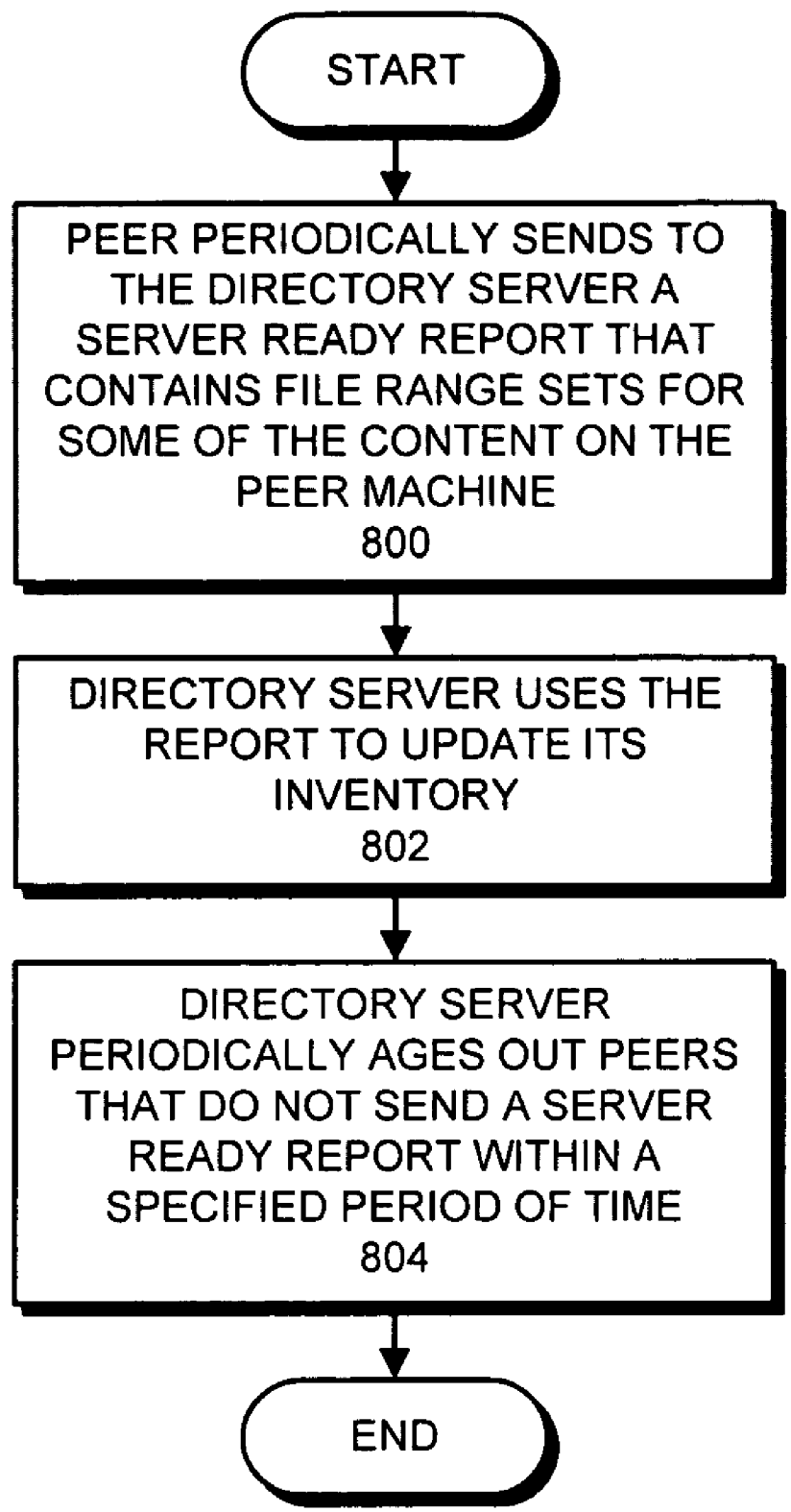
FIG. 8 presents a flowchart illustrating the aging of inventory in accordance with an embodiment of the present invention.

FIG. 8 illustrates the process of inventory aging in accordance with an embodiment of the present invention. Peer 101 periodically sends directory server 104 a server ready report that contains file range sets for content that is available on peer 101 (step 800). Note that in one embodiment of the present invention, peer 101 sends the server ready report to logging server 110 which provides the information to directory server 104. Once directory server 104 has this new information, directory server 104 updates inventory 212 to reflect any changes specified by the new information (step 802). In another embodiment of the present invention, peer 101 sends the server ready report directly to directory server 104. Periodically, directory server 104 ages out peers that have not sent a server ready report within a pre-specified period of time (step 804).

Implementation Details

This section provides an overview of the policy governing distribution of data (media objects) in accordance with an embodiment of the present invention. Note that the implementation details described in this section are exemplary and are not meant to limit the present invention.

Peer Overview

The back end of the client (the peer) handles loading and serving, based on metadata and user requests processed by the front end. It devotes a certain number of threads to loading, and to serving (for example, 12 each). Each such loader or server can support one connection. In the absence of throttling, the peer will accept server connections up to this limit, and will establish loader connections up to this limit if there is work to be done.

The peer receives a request to load content. The object is assigned a priority. Higher priority objects are loaded in preference to lower priority objects. If there is work to be done on a higher priority object and no available loader, the lowest priority loader is preempted and reassigned to the higher priority object. In one embodiment of the present invention, there is a file priority for each type of file, and furthermore, there is a peer priority for each peer that can act as a server for the file.

Objects can be prioritized as follows:
1. Objects marked by the front end as "foreground" are associated with the users current activity. These foreground objects take precedence over those marked background, which not directly related to the users current activity (e.g., objects that are automatically pushed by subscription).
2. Otherwise, objects are prioritized first-come, first-served.

The peer transforms the load request into a set of candidate servers or targets. These are potential sources for the content, and are prioritized first by "object priority" (also referred to as "file priority"), and then by target priority (also referred to as "loader priority"). A free loader takes on the highest priority available target. (An exception to this is that a target that does not support range requests is not taken on if there is any other available or loading target for the same object.) A target is generally never taken on by multiple loaders.

The requested object is marked by the front end as either known or unknown. If it is unknown, then the request will provide a hypertext transfer protocol (http) or file transfer protocol (ftp) uniform resource locator (url). Several targets (for example four, or one if bonding is disabled) representing that url are created. If the object is known, then one target is created, representing the directory server expected to provide further targets. The targets returned by the directory server are labeled with target priorities, all greater than the target priority of the directory server itself.

Targets for a loading object are either loading, available, backed off, or marked bad. If the front end pauses and resumes loading of an object, all of its targets are made available. A target is backed off or marked bad if loading from the target ends in an error. A backed-off target becomes available again at a specified time in the future. Repeated backoffs are for greater time intervals, up to a maximum (for example, ¼, 1, 4, 16, and 64 minutes). The backoff interval is reset by successful loading. The directory server starts at a one-minute backoff, even when it returns targets (which resets its backoff interval).

Directory Server Overview

Directory server 104 receives a request for targets for a media object. The request includes the list of targets already known to the requester. Directory server 104 returns a list of targets not already known, with target priorities and the information needed to contact them.

If directory server 104 knows nothing about the object, then it will tell the requester to stall five seconds and try again. Meanwhile, it will contact the metadata server for information about the object. The metadata server contains information about all of the published content including the original source for the content. If this fails, it remembers the failure for a period of time (for example, two minutes), and tells any peers requesting targets for that object that it is not found. (This causes the peers to abort the download.) If the metadata fetch succeeds, then directory server 104 learns of one or more origin servers that it can return as targets.

If directory server 104 provides the requester with potential targets, then it adds the requester to its set of possible targets. The requester will expire out of this set after a period of time (for example, two hours, or immediately if the requester has opted out of the network). To keep the directory server target set fresh, peers report periodically (for example, hour) what objects they can serve.

Directory Server Response Policy

The list of targets (peers and origins) returned for a known object is determined as follows (in order of decreasing precedence):
1. If a target is reported as known by the requester, then it is not returned.
2. Each request from the requester for the object that results in returned targets is counted. If sufficient time has elapsed since the last satisfied request (say 30 minutes), then the count is reset. If the count is 500 or higher, then no peer targets are returned. This protects peer and directory server from excessive requests.
3. At most a pre-specified number of targets are returned.
4. Aged out peers are not returned.
5. Each return of a peer (as a target for any object) is counted. When a peer visits directory server 104, this count is reset to the peer's current number of active serving threads.
6. Targets of highest priority are returned.
7. Origins are assigned lower priority than peers.
8. Peers have a base priority of two. If they have a nonzero return count, then their base priority is one divided by return count. (This distributes load)
9. Peer priority is increased by 330(=10(32+1)) if it has the same external IP address as the requester. Otherwise, peer priority is increased by 210(=10(20+1)) if it shares the first 20 bits (configurable) of its external IP address with the requester. Otherwise, peer priority is increased by 10(=10(0+1)) if it is in the same (nonzero) ASN as the requester. (prefers local sources)

Peer Loader Overview

The peer loader, which is a mechanism that receives a piece of a file, requests data from a target one range at a time. This range size needs to be big enough that the request overhead is small, but small enough that the peer can quickly adapt to changing loader availability and performance. The loader reads this range one read-range at a time. The read-range size, which facilitates throttling, is the expected size downloadable in one second, and has a 10 second timeout. Errors and other loader exit conditions are checked after each read-range, and the read is interruptible if the download is finished or canceled. Request range size is capped at the larger of 128 KB and the read-range.

Range Allocation

A target that does not support range requests is effectively asked for the first needed range. Any other target is asked for a range starting at a preferred offset, and stopping at the size cap, the end of file (EOF), or the next range already loaded or allocated to a loader. If a loader reaches a range allocated to another loader, it is preempted (the loader gives up the target, which is made available for other loaders). When there is little left to download, loaders may all load the same range (racing to finish the download).

To find the preferred offset, the loader first generates a candidate range set, then chooses a range from the set. The candidate range set can be the first of the following that is nonempty:
1. set of bytes that are unallocated, that the target has, and that all other incomplete loading targets don't have (so peer is completing a different range than its "neighbors");
2. set of bytes that are unallocated, and that the target has;
3. set of bytes that are unallocated; and
4. set of bytes that are allocated to another loader.

Then the chosen range from that range set can be either:
1. contiguous with the last range received from the target;
2. part of an open-ended range at the end of a set of unknown maximum size;
   The offset is at a distance of 32*(the range size cap) from the beginning of this range. (This is to discover how far the file extends by stepping out until EOF is found.)
3. part of the largest range in the range set;
   The offset is at the middle of this range if there are enough bytes thereafter for a full size range, or if the range bytes are allocated to another loader. (If loaders attempt to start their loads as far from each other as possible, then they will be better able to load contiguously before bumping into something already loaded by someone else.)
   Otherwise, the offset is at the beginning of this range. (So ranges are not subdivided down to inefficiently small sizes.)

Errors

I/O errors cause a backoff. An exception is when a connection to a peer target cannot be made; this causes the target to be marked bad. If a target reports an inconsistent file size, or that it doesn't have the object file or doesn't grant permission to load, then the target is marked bad. If the directory server returns such a report, then the download is aborted.

Every file has a signature that is composed of a set of block signatures. During the download, each 1 MB block is checked as it is completed. If a block check fails, then any peer targets contributing to it are marked bad. If the block was supplied entirely by origins, then the download is aborted.

A backoff error can also be caused by poor service. Poor service can be defined as no bytes for two minutes, or if after two minutes all loaders are busy, and there is an available target for the object, and this loader is getting less than a third the average bandwidth for loaders of this object or less than 250 bytes/sec.

A stall request greater than ten seconds, or one from a directory server, is handled as a backoff (the loader gives up the target) rather than a pause.

Peer Server Overview

If a peer is opted out of the network, or does not know of an object, or its copy is bad, then it will not serve the object. Otherwise, it serves the largest contiguous range of bytes that it has that have been signature checked (if there was a block signature) and that the requester requested. Signature checking involves calculating a checksum of a block, and comparing it to an encrypted checksum from a trusted source to ensure data integrity. If there are no such bytes, then the server will tell the requester to stall for 5 seconds and then try again. The server reports what bytes it has to the requester, so the next request can be better informed. If the server is still loading the object, then it adds the requester to its list of targets. (The server learns what bytes the requester has as part of the request.)

Implementation Notes

Each peer, and the directory server, maintains an in-memory database, or inventory, of objects and targets. The inventory is a set of object entries (MOs), a set of peer and origin entries (Nodes), and a set of entries with information about the state of the object on the peer or origin (MONodes). Each entry contains information about the relevant entity. For example, Nodes contain contact information such as IP addresses and ports, and MONodes contain a range set that records which portions of an object file are available on a peer or origin. The inventory also maintains subsets of these sets sorted by various criteria to make access fast. For example, the inventory maintains subsets of MONodes sorted by object and then by target priority. The directory server lazily removes expired entries. The peer removes target entries when the download is complete or canceled, and removes object entries when the object is deleted.

Building a Router Graph

Figure 9:
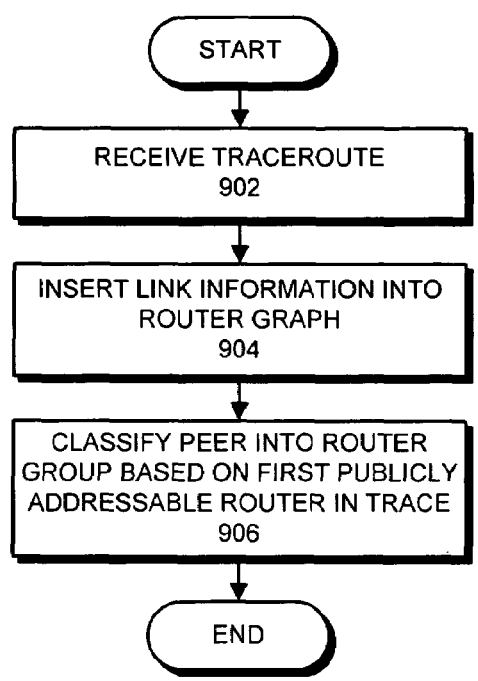
FIG. 9 presents a flowchart illustrating the process of building a router graph in accordance with an embodiment of the present invention.

FIG. 9 presents a flowchart illustrating the process of building a router graph in accordance with an embodiment of the present invention. The system starts by receiving a traceroute at directory server 104 from peer 101 (step 902). Note that the traceroute can specify a path from peer 101 to directory server 104, from peer 101 to peer 102, or from peer 101 to any other node in distributed computing system 100. Directory server 104 analyzes the traceroute received from peer 101, and inserts corresponding link information inferred from the traceroute into router graph 206 (step 904). Router graph 206 represents how nodes in distributed computing system 100 are interconnected. Note that router graph 206 can evolve over time. Moreover, nodes and connections within router graph 206 can be removed if they have not been reported to directory server 104 for a specified time period.

Directory server 104 can also use the trace information to classify peers into router groups (step 906). A router group is a collection of nodes that are behind the same publicly addressable router. Because there can be many smaller subnets and routers behind the first publicly addressable router, router groups can be large or small. However, if two nodes are within the same router group, chances are high that they are topologically close to each other in the network.

Optionally, peer 101 sends the MAC address of its gateway router to directory server 104 to facilitate in building the router graph. If two or more clients report the same MAC address for their gate router, it can be determined that they are on the same subnet. Moreover, if two or more clients have IP addresses that appear to be in the same subnet, but they report different MAC addresses for their gateway routers, they are likely to be in different subnets. This is often the case as many clients in different subnets have a private address in the 192.168.1.x address space.

Utilizing a Network Arena

Figure 10:
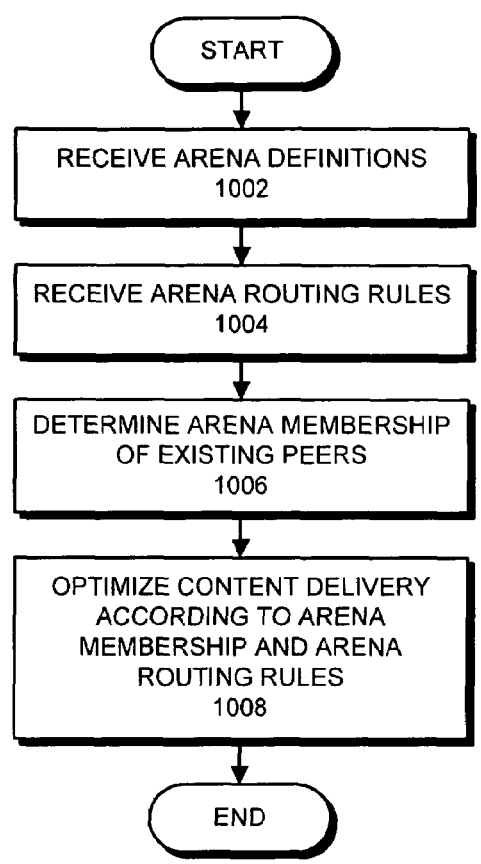
FIG. 10 presents a flowchart illustrating the process of utilizing a network arena in accordance with an embodiment of the present invention.

FIG. 10 presents a flowchart illustrating the process of utilizing network arena 204 in accordance with an embodiment of the present invention. In the present invention, an arena, such as arena 204, is an administrative unit that contains a group of nodes. Arena 204 could be as small as a router group or a local network, or arena 204 could be as large as an entire AS, or possibly even larger. Definitions can include subnets, IP/X ((IP/X network is a collection of nodes that share a common Internet Protocol address prefix consisting of X bytes), network ranges (IP/X network is a collection of nodes that share a common IP address prefix consisting of X bytes), and nodes behind specific routers. The system starts be receiving a definition for arena 204 from a system administrator (step 1002). The system can also receive corresponding routing rules from the system administrator (step 1004). These routing rules can define the order of precedence for fallback within each match set within match sets 200. Additionally, these rules define the order of precedence for fallback between match sets, as well as which sets to avoid, and when to return to origin server 112.

Next, the system determines the arena membership of existing peers (step 1006). This can be done periodically, as well as every time a request for content is made. It is important to periodically recheck membership because nodes can be moved from one arena to another. Finally, the system optimizes content delivery within distributed computing system 100 according to arena membership and routing rules (step 1008). In one embodiment of the present invention, system administrators can minimize traffic across a specific link by defining routing rules that prohibit peers in distributed computing system 100 from delivering or accessing content across the prohibited link, even if it appears to be the best match for distributed content delivery.

Focused Peering

Existing peer-to-peer networks are typically developed to deliver content to each peer in the network as fast as possible. However, often the performance of the network as a whole suffers as each peer tries to receive the content at the fastest possible rate. One embodiment of the present invention introduces the notion of "focused peering" to offer the highest possible download rate at the client without compromising the integrity or performance of the network.

Focused peering involves setting a minimum threshold value for the peers on the network. For example, when peer 101 receives a list of possible candidate servers for the content from directory server 104, peer 101 first tries to contact candidate servers on the same subnet as peer 101. As long as peer 101 receives content at the subnet level at a rate that exceeds the minimum threshold value, peer 101 does not contact the candidate servers at the next level. If the rate at which peer 101 receives content at the subnet level falls below the minimum threshold value, peer 101 then contacts candidate servers at the next level, such as candidate servers in the same arena as peer 101, according to the routing rules described earlier. Conversely, if peer 101 is receiving content from candidate servers on the same subnet as peer 101, as well as from candidate servers in the same arena as peer 101, and the rate at which peer 101 receives content from the candidate servers on the same subnet as peer 101 exceeds the minimum threshold value, peer 101 will stop receiving content from the candidate servers in the same arena as peer 101 and focus solely on candidate servers on the same subnet as peer 101.

Focused peering allows a network administrator to set the minimum performance value that is acceptable for a peer on the network, and helps to minimize network congestion as well as network cost. By maximizing traffic at the LAN level and minimizing traffic at the WAN level, network administrators can realize reduced network cost while keeping the WAN connections available for other critical applications. Additionally, the minimum threshold value can be continually adjusted to find the optimum balance of LAN and WAN traffic.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining a network topology in a peer-to-peer network, the method comprising:
   performing a tracerouting operation to obtain a traceroute from a first client to a directory server, wherein a traceroute is a map of a path through which a packet travels between the first client and the directory server, including addresses of routers through which the packet travels;
   determining a MAC address of a gateway of the first client;
   sending the traceroute and the MAC address to the directory server from the first client; and
   using the traceroute at the directory server to build a router graph;
   wherein the router graph represents a topology of the peer-to-peer network; and
   wherein the directory server can use the MAC address to determine if any other clients are on a same subnet as the first client.

2. The method of claim 1, further comprising:
   performing a second tracerouting operation between the first client and a second client; and
   sending the second traceroute to the directory server.

3. The method of claim 1, further comprising:
   sorting a list of addresses for routers received at the directory server from the traceroutes; and
   using the sorted list to determine which addresses are assigned to which routers, wherein each router has two or more network interfaces and each interface has an address.

4. The method of claim 1, further comprising using the router graph to optimize data transfer within the peer-to-peer network.

5. The method of claim 1, further comprising classifying the first client as a member of a router group based on a first public address found in the traceroute, wherein the router group is a collection of clients that communicate through a common router.

6. The method of claim 1, further comprising removing information from the router graph if the information has not been validated for a specified period of time.

7. A computer-readable storage medium storing instructions that when executed by a computer cause the computer to perform a method for determining a network topology in a peer-to-peer network, the method comprising:
performing a tracerouting operation to obtain a traceroute from a first client to a directory server, wherein a traceroute is a map of a path through which a packet travels between the first client and the directory server, including addresses of routers through which the packet travels;
determining a MAC address of a gateway of the first client;
sending the traceroute and the MAC address to the directory server from the first client; and
using the traceroute at the directory server to build a router graph;
wherein the router graph represents a topology of the peer-to-peer network; and
wherein the directory server can use the MAC address to determine if any other clients are on a same subnet as the first client.

8. The computer-readable storage medium of claim 7, wherein the method further comprises:
performing a second tracerouting operation between the first client and a second client; and
sending the second traceroute to the directory server.

9. The computer-readable storage medium of claim 7, wherein the method further comprises:
sorting a list of addresses for routers received at the directory server from the traceroutes; and
using the sorted list to determine which addresses are assigned to which routers, wherein each router has two or more network interfaces and each interface has an address.

10. The computer-readable storage medium of claim 7, wherein the method further comprises using the router graph to optimize data transfer within the peer-to-peer network.

11. The computer-readable storage medium of claim 7, wherein the method further comprises classifying the first client as a member of a router group based on a first public address found in the traceroute, wherein the router group is a collection of clients that communicate through a common router.

12. The computer-readable storage medium of claim 7, wherein the method further comprises removing information from the router graph if the information has not been validated for a specified period of time.

13. An apparatus for determining a network topology in a peer-to-peer network, the apparatus comprising:
a tracerouting mechanism configured to perform a tracerouting operation to obtain a traceroute from a first client to a directory server, wherein a traceroute is a map of a path through which a packet travels between the first client and the directory server, including addresses of routers through which the packet travels;
a determination mechanism configured to determine a MAC address of a gateway of the first client;
an upload mechanism configured to send the traceroute and the MAC address to the directory server from the first client; and
a graph building mechanism configured to use the traceroute at the directory server to build a router graph;
wherein the router graph represents the topology of the peer-to-peer network; and
wherein the directory server can use the MAC address to determine if any other clients are on a same subnet as the first client.

14. The apparatus of claim 13, wherein the tracerouting mechanism is further configured to perform a second tracerouting operation between the first client and a second client, and is further configured to send the second traceroute to the directory server.

15. The apparatus of claim 13, further comprising:
a sorting mechanism configured to sort a list of addresses for routers received at the directory server from the traceroutes; and
a determination in mechanism configured to use the sorted list to determine which addresses are assigned to which routers, wherein each router has two or more network interfaces and each interface has an address.

16. The apparatus of claim 13, further comprising an optimization mechanism configured to use the router graph to optimize data transfer within the peer-to-peer network.

17. The apparatus of claim 13, further comprising a classification mechanism configured to classify the first client as a member of a router group based on a first public address found in the traceroute, wherein the router group is a collection of clients that communicate through a common router.

18. The apparatus of claim 13, further comprising a removal mechanism configured to remove information from the router graph if the information has not been validated for a specified period of time.

* * * * *